US010719618B2

(12) United States Patent
Kakumani et al.

(10) Patent No.: US 10,719,618 B2
(45) Date of Patent: Jul. 21, 2020

(54) FEDERATED CONFIGURATION OF DISTRIBUTED ACCESS, AUTHENTICATION, AND AUTHORIZATION SYSTEMS

(71) Applicant: Microsoft Technology Licensing, LLC, Redmond, WA (US)

(72) Inventors: Raja Charu Vikram Kakumani, Redmond, WA (US); John Erik Araya, Seattle, WA (US); Muhammad Omer Iqbal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 275 days.

(21) Appl. No.: 15/916,238

(22) Filed: Mar. 8, 2018

(65) Prior Publication Data

US 2019/0278929 A1    Sep. 12, 2019

(51) Int. Cl.
*G06F 21/62* (2013.01)
*H04L 29/06* (2006.01)
*G06F 16/22* (2019.01)
*H04L 29/08* (2006.01)

(52) U.S. Cl.
CPC ...... *G06F 21/6218* (2013.01); *G06F 16/2246* (2019.01); *G06F 21/629* (2013.01); *H04L 63/08* (2013.01); *H04L 63/102* (2013.01); *H04L 67/10* (2013.01)

(58) Field of Classification Search
CPC ............... G06F 16/2246; G06F 21/10; G06F 21/121–128; G06F 21/31; G06F 21/604; G06F 21/6218–6281; G06F 21/629; G06F 2221/2141; G06F 2221/2145; H04L 63/08; H04L 63/10–105; H04L 63/20–205; H04L 67/10
See application file for complete search history.

(56) References Cited

U.S. PATENT DOCUMENTS

| 8,090,873 | B1 * | 1/2012 | Wookey | H04L 51/14 707/600 |
| 2005/0137892 | A1 * | 6/2005 | Porter | G06Q 10/06375 705/26.1 |
| 2007/0005801 | A1 * | 1/2007 | Kumar | H04L 63/08 709/238 |

* cited by examiner

*Primary Examiner* — Kevin Bechtel
(74) *Attorney, Agent, or Firm* — Workman Nydegger

(57) ABSTRACT

A system includes a processor and a computer-readable medium configured to store instructions for execution by the processor. The instructions include receiving a first document corresponding to a first application hosted by a distributed computing provider. The instructions include parsing the first document into a first data structure according to a data structure definition. The data structure definition describes an inheritance property. The instructions include, in response to presence of a first inheritance property in the first data structure: identifying an inherited document based on the first inheritance property; obtaining the inherited document; reading the inherited document; determining inheritance permissions from the inherited document; and, in response to the inheritance permissions permitting the first document to inherit the inherited document, selectively modifying the first data structure based on the inherited document. The instructions include controlling authentication of a user to the first application according to the first data structure.

20 Claims, 13 Drawing Sheets

US 10,719,618 B2

FEDERATED CONFIGURATION OF DISTRIBUTED ACCESS, AUTHENTICATION, AND AUTHORIZATION SYSTEMS

The entire contents of three computer program listing appendices electronically submitted with this application—base_xml.txt, 42,166 bytes, created Mar. 8, 2018; intermediate_xml.txt, 8,888 bytes, created Mar. 8, 2018; and leaf_xml.txt, 2,362 bytes, created Mar. 8, 2018—are hereby incorporated by reference.

FIELD

The present disclosure relates to access, authentication, and authorization systems and more particularly to apparatuses and methods for automated configuration of access, authentication, and authorization systems.

BACKGROUND

In a highly configurable system, a specification document may define various parameters for operation. For example, the specification document for a personal computer security framework may define when a password is required (such as after a screen saver is displayed or the computer wakes from sleep), password complexity rules, whether removable storage must be encrypted, etc. For example, these settings may be referred to as group policy objects, registry settings, etc. The specification document may be a text file or may take the form of a set of options in a structured data store, such as a database.

The more complex the system, and the more configurable the system, the more complex the specification document may be. Logically and logistically, maintaining and acting on the specification document becomes much more complex when different parties need to exert control over the specification document. The situation is particularly problematic when multiple parties attempt to exert control over the same portion or specific setting of the specification document.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a processor and a computer-readable medium configured to store instructions for execution by the processor. The instructions include receiving a first document corresponding to a first application hosted by a distributed computing provider. The instructions include parsing the first document into a first data structure according to a data structure definition. The data structure definition describes an inheritance property. The instructions include, in response to presence of a first inheritance property in the first data structure: identifying an inherited document based on the first inheritance property; obtaining the inherited document; reading the inherited document; determining inheritance permissions from the inherited document; and, in response to the inheritance permissions permitting the first document to inherit the inherited document, selectively modifying the first data structure based on the inherited document. The instructions include controlling authentication of a user to the first application according to the first data structure.

In other features, the controlling authentication includes selecting a security token service specified by the first data structure and redirecting the user to the selected security token service. In other features, the instructions include, in response to presence of additional inheritance properties in the first data structure, recursively repeating the identifying, the obtaining, the parsing, the reading, the determining, and the selectively modifying for each of the additional inheritance properties in the first data structure.

In other features, identifying the inherited document based on the first inheritance property includes using a unique identifier of the inherited document. The unique identifier is contained in the first inheritance property. In other features, reading the inherited document includes parsing the inherited document into a second data structure according to the data structure definition. In other features, the instructions include, after the selectively modifying, storing the first data structure as an output document for future use.

In other features, the instructions include updating the output document in response to modifications to either the first document or the inherited document. In other features, the first document is received in response to an authentication request from the first application. In other features, the parsing the first document into the first data structure is limited to portions of the first document governing the authentication request. In other features, the parsing the first document includes determining a file type of the first document and selecting a parser from a plurality of parsing engines based on the determined file type.

A computer-implemented method includes receiving a first document corresponding to a first application hosted by a distributed computing provider. The method includes parsing the first document into a first data structure according to a data structure definition. The data structure definition describes an inheritance property. The method includes, in response to presence of a first inheritance property in the first data structure: identifying an inherited document based on the first inheritance property; obtaining the inherited document; reading the inherited document; determining inheritance permissions from the inherited document; and, in response to the inheritance permissions permitting the first document to inherit the inherited document, selectively modifying the first data structure based on the inherited document. The method includes controlling authentication of a user to the first application according to the first data structure.

In other features, the controlling authentication includes selecting a security token service specified by the first data structure and redirecting the user to the selected security token service. In other features, the method includes, in response to presence of additional inheritance properties in the first data structure, recursively repeating the identifying, the obtaining, the parsing, the reading, the determining, and the selectively modifying for each of the additional inheritance properties in the first data structure. In other features, identifying the inherited document based on the first inheritance property includes using a unique identifier of the inherited document. The unique identifier is contained in the first inheritance property. In other features, reading the inherited document includes parsing the inherited document into a second data structure according to the data structure definition.

In other features, the method includes, after the selectively modifying, storing the first data structure as an output document for future use. In other features, the method includes updating the output document in response to modifications to either the first document or the inherited document. In other features, the first document is received in response to an authentication request from the first application. In other features, the parsing the first document into the first data structure is limited to portions of the first document governing the authentication request. In other features, the parsing the first document includes determining a file type of the first document and selecting a parser from a plurality of parsing engines based on the determined file type.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 2:
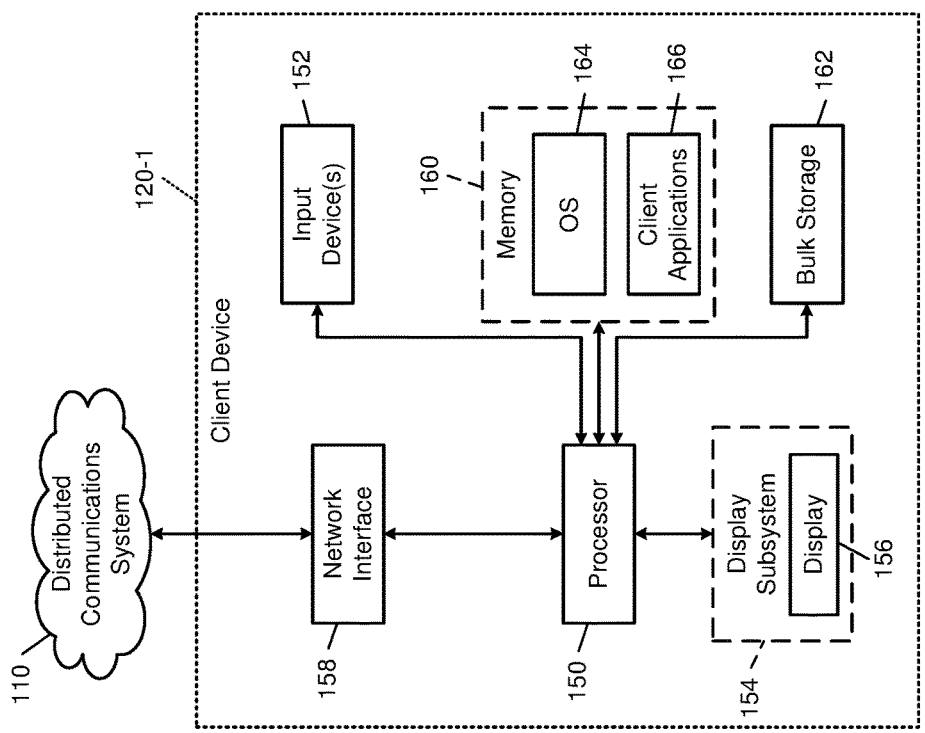
FIG. 2 is a functional block diagram of an example implementation of a client device.

The present disclosure describes a system architecture that relies on a hierarchy of documents that specify inter-document inheritance and includes systems and methods for processing the inheritance relationships specified by the documents. For example, a security policy, including technical specifics of server locations and message formats, may be defined by a document hierarchy.

In a distributed computing system (sometimes referred to as a cloud computing system), a host of the computing system may specify a base security policy in a base document. Each tenant of the cloud hosting provider may specify a tenant-specific policy that inherits from the base policy document. A tenant of a cloud hosting provider may be a corporation, with various departments within the corporation having different security policies. Therefore, each department of the tenant may have a department-specific security policy that inherits from the tenant-specific policy document. While the discussion below will continue this security policy use case as an illustrative example, the present disclosure broadly applies to any set of digital documents and related systems organized hierarchically as described below.

Digital content that could theoretically be contained within a single document may be split across multiple documents for a variety of reasons. In some scenarios, this split may be necessary for technical, legal, or other reasons, or may be preferable based on logistical or other considerations. For example, when multiple documents include substantial amounts of overlap, the common material may be separated out. Individual documents then include only the differences and inherit and modify the common document.

In some scenarios, there may be few or no portions in common with another document. However, that document may be split into different sections, where each section may be stored in a different location, be controlled by a different entity, or be subject to different compliance or legal frameworks. As just one example, a base security policy may be specified by a governmental entity. Cloud hosting providers may inherit that policy and extend or modify that policy to suit the distributed computing functions that they offer. This hierarchy may be dictated by laws or regulations in a particular governmental entity's jurisdiction. In other scenarios, the hierarchy may be reversed. For example, a cloud hosting provider may establish a base security policy, which is inherited and modified for different jurisdictions.

Digital documents according to the present disclosure are configured to control computerized systems. In other words, the digital documents are not merely human readable but instead have semantic meaning to computerized systems and dictate how a computerized system or systems will perform. In fact, there is no requirement that the documents be human readable. The digital documents may be text files and may respectively conform to one or multiple formats, such as Extensible Markup Language (XML) and JavaScript Object Notation (JSON).

The inheritance framework allows one or more documents (referred to as derived documents) to reference one or more other documents (referred to as base documents) so that the derived documents can utilize the behaviors as they are, modify them, overwrite them, or remove them. This inheritance may be recursive, with each referenced document in turn referencing other documents.

The present disclosure therefore provides a technological definition for a hierarchical set of documents and specifies a technological system for automating creation of a document (called a resulting document) from the hierarchical set of documents. Further disclosed is how a computer system programmatically operates according to the resulting document, without requiring human intervention. In various implementations, the hierarchical set of documents occupies less space than the storage of standalone documents in other words, allowing increased storage efficiency. Further, the hierarchical set of documents reduces the likelihood of errors and inconsistencies across duplicated content. By maintaining the constituent documents in different security domains, the hierarchical set of documents may also enhance information security of the computer system governed by the resulting document.

The format of the documents can vary. The inheritance framework may dictate the same format for the entire document, so that all features are symmetric instead of varying in format. The inheritance framework may dictate that both base and derived documents have the same format and structure, so they are symmetric, which can make inheritance easier for authors as described in more detail below. The inheritance framework may allow the ability to have both base and derived documents in the same format, but structure may vary. For example, both documents could be expressed in XML, but the schema could vary. Further, the inheritance framework may allow the ability to have a derived document expressed in one format (e.g., JSON) and the base document expressed in another (e.g., XML).

A digital document according to the present disclosure includes one or more parts. The term "part" may correspond to particular structures in existing formats. For example, the "part" could represent an element in an XML document or an object in a JSON document. Each part can include:
- one or more parts;
- a collection of parts;
- other content that is not classified as a part; and
- references to external resources (for example, files, secrets, URL-based content, etc.).

A document that supports inheritance has a unique identifier so that it can be located by other documents. Any part of a document that can be inherited has a unique identifier within the document in which it appears. This identifier is used to locate that part in the document. The format of this identifier is defined by the implementation—as an example, the identifier may include a domain suffix based on a domain name under control of the author to distinguish from documents from other authors.

One part in a document can derive from another part in the same or another document by explicitly referring to that part using the document's and part's identifiers. A variation of this is for a document to declare that all parts inherit from a single document (referred to as its base document). In that case, the document may reference the base document only once. The deriving document is said to be overriding the base document. Automatic inheritance can be performed if the identifier of a part in the derived document matches the identifier of a part in the base document. In other words, a document can declare its base document once and allow parts to derive other parts with the same identifier.

Inheritance may take the form of inclusion, similar to the preprocessing directive "include" in the C programming language. In other words, a deriving document may include an identifier of a base document to simply incorporate the text of the base document wholesale. The inheritance framework may be configured to support only a single form of inheritance or multiple forms of inheritance.

Another form of inheritance is for the derived document to integrate the contents of a base document and override only matching content. One way of determining a match is to compare the string of labels that define a key in the base document to the string of labels that define a key in the derived document.

For example, a document with an internal hierarchy can be viewed as a tree with various nodes beneath the root node (visualizing the tree as top-down, with the root at the top). Each of those nodes may have respective sub-nodes below it, continuing until leaf nodes are reached. In various implementations, there is no requirement that all leaf nodes be at the same level (number of steps away from the root node). Each node (including leaf nodes but not necessarily including the root node) has a corresponding label, which is unique among the nodes that are at the same level and below the same node. The hierarchical label of a leaf node can be created by a concatenation of the label of each node in the path from the root node to the leaf node.

As one specific example, a leaf node of the derived document may have the value of "JWT Issuer" and a label of DisplayName. The full hierarchical label for the leaf node in the example derived document is ClaimsProvider:TechnicalProfiles:TechnicalProfile Id="JwtIssuer":DisplayName. If this hierarchical label matches a hierarchical label in the base document, the value in the base document will be replaced with "JWT Issuer." However, if the base document does not have a node with that hierarchical label, then this leaf node would be added to the document tree of the base document.

The base document can impose document-level inheritance restrictions such as the following:
1. Disallow a document to be inherited altogether.
2. Allow a document to be inherited by any document.
3. Allow a document to be inherited by some documents based on conditions.

Conditions supported by the inheritance framework include the following:
1. The base document may dictate that the deriving documents be managed by an entity or set of entities.
   For example, a base document may declare that an organization (such as a government, corporation, or individual) or group must be in control of documents that may derive from it.
   A number of existing approaches can be used to determine the ownership of deriving documents. For example, the fully qualified domain name (FQDN) at which a deriving document is located may indicate the ownership of the document.
2. The base document may restrict parts of the document from being inherited. In such a case, only parts that are allowed may be inherited.
   This may be expressed as an allow list—that is, nothing can be inherited except what is allowed by the base document.
   Or it may be expressed as a block list—that is, everything may be inherited except what is restricted by the base document.
   The base document may specify allow and block lists on a document-wide or per-part basis.
3. The base document may impose a certain structure (such as requiring existence of certain parts) on documents that may derive from it.
4. The base document may declare that the deriving documents must have certain content, including (i) requiring a predefined format of the document or part identifiers, (ii) requiring certain external references be present (e.g., to files, secrets, or URLs), and/or (iii) requiring that certain content or portions of it be present.
5. The base document may restrict how many levels the derivation hierarchy is allowed to contain.
   Therefore, if a base document declares that only one level of derivation hierarchy is allowed, then no document may derive from the document that derives from the base.

6. The base document may restrict how many total documents may derive from it.
7. All the conditions mentioned above may likewise be imposed on the base document by a deriving document. If a condition is violated, then inheritance will not take place even if it renders the deriving document incomplete.

During inheritance, the following operations may be applied:
1. A part may be left unmodified. This can be achieved simply by the deriving document not overriding that part of the base document.
2. An addition may be made to a part by adding new content that is not contained in the base document.
3. A modification changes some or all of the content of a part already defined in the base document.
4. A deletion removes the content (or a part) defined in the base document.

Parts that contain collections can specify additional collection-based behaviors, such as:
1. Appending items to a collection defined in the base document.
2. Prepending items to a collection defined in the base document.
3. Replacing one or more items in a collection defined in the base document.
4. Removing items from a collection defined in the base document.
5. Replacing the entire collection defined in the base document.

The inheritance framework allows for polymorphism, which allows content that is defined in a base document to be extracted from the derived document. A part (the referencing part) in a document may reference another part (the referenced part) in that document to utilize its content. A derived document may override both the referencing part and the referenced part. Polymorphism dictates that even though the actual reference between the referencing and referenced parts is in the base document, any overrides to the referenced parts in the derived document must be merged with that of the base document before it is consumed.

Environment

Below are simplistic examples of a distributed computing environment in which the systems and methods of the present disclosure can be implemented. Throughout the description, references to terms such as servers, client devices, applications, and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 1:
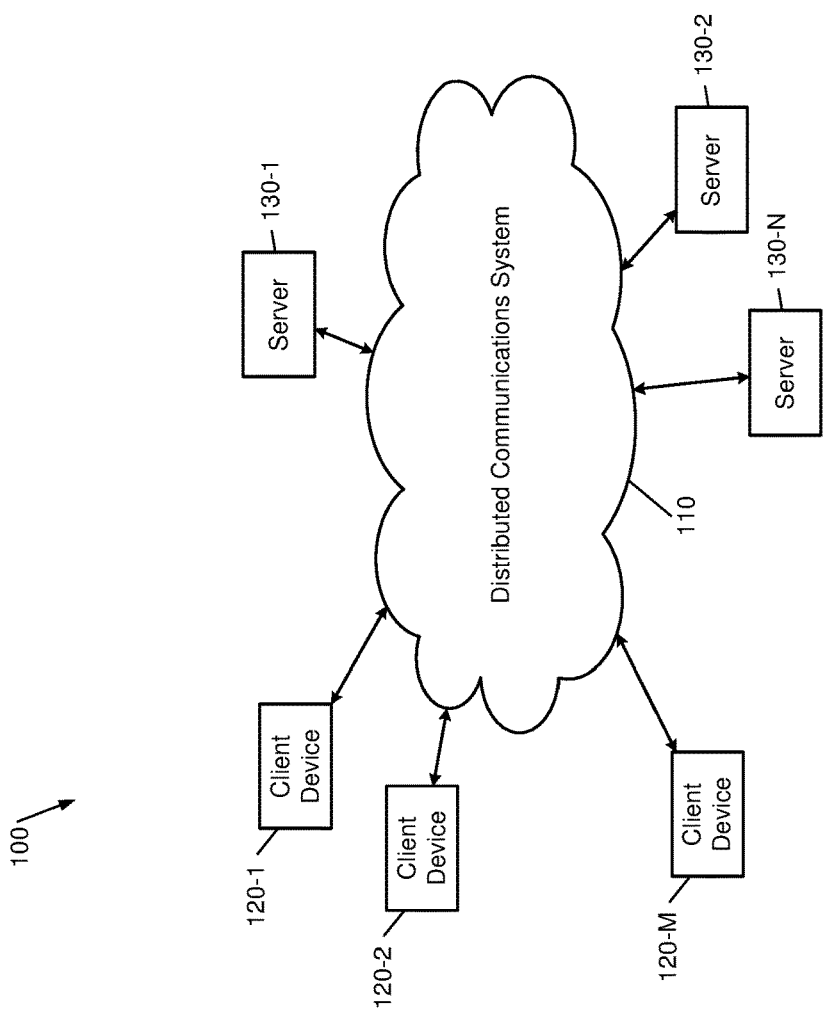
FIG. 1 is a block diagram of a simplified distributed computing system.

FIG. 1 shows a simplified example of a distributed computing system 100. The distributed computing system 100 includes a distributed communications system 110, one or more client devices 120-1, 120-2, . . . , and 120-M (collectively, client devices 120), and one or more servers 130-1, 130-2, . . . , and 130-N (collectively, servers 130). M and N are integers greater than or equal to one. The distributed communications system 110 may include a local area network (LAN), a wide area network (WAN) such as the Internet, or other type of network. The client devices 120 and the servers 130 may be located at different geographical locations and communicate with each other via the distributed communications system 110. The client devices 120 and the servers 130 connect to the distributed communications system 110 using wireless and/or wired connections.

The client devices 120 may include smartphones, personal digital assistants (PDAs), tablets, laptop computers, personal computers (PCs), etc. The servers 130 may provide multiple services to the client devices 120. For example, the servers 130 may execute software applications developed by one or more vendors. The servers 130 may host multiple databases that are relied on by the software applications in providing services to users of the client devices 120.

Any of the client devices 120 or the servers 130 may be controlled by a hierarchical document according to the principles of the present disclosure. In various implementations, the documents in the hierarchy may be stored on one of the servers 130 or across multiple ones of the servers 130. As indicated above, the servers 130 may not all be under the control of the same entity. In other words, the server 130-1 may store one document under the control of a governmental entity, while the server 130-2 may store other documents and be under the control of a corporation.

When an inherited document will be used to control the server 130-1, that inherited document may be created by the server 130-1 or by another device, such as another one of the servers 130. In some cases, an inherited document may control operation of multiple devices within FIG. 1. For example, an authentication framework may govern how the client device 120-1 interacts with the server 130-1 for authentication purposes. Such a document may also govern how the connection between the client device 120-1 and the server 130-1 is secured.

Evaluating hierarchical inheritance and creating a resulting document may be implemented as a client application that executes on one of the client devices 120. Additionally or alternatively, evaluation of hierarchical documents and generation of a resulting document may be implemented as a server application executing on one of the servers 130.

FIG. 2 shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110.

Figure 3:
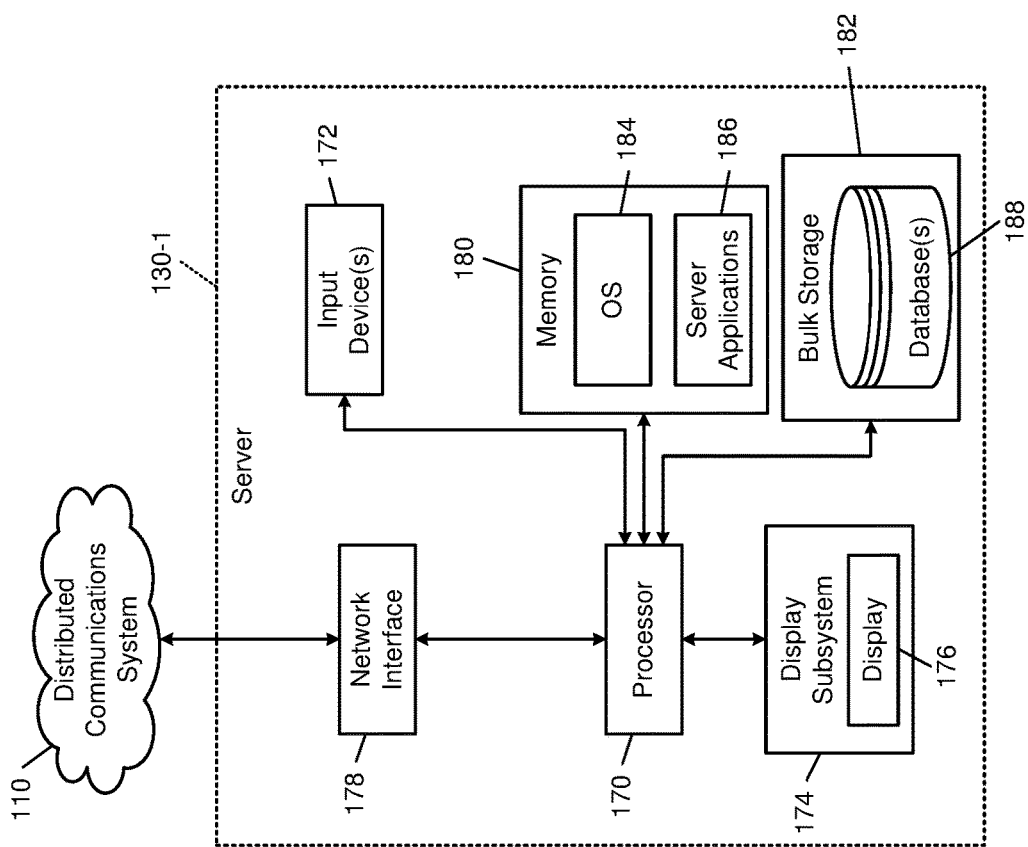
FIG. 3 is a functional block diagram of an example implementation of a server.

FIG. 3 shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized architecture. The bulk storage 182 may store one or more databases 188 that store data structures used by the server applications 186 to perform respective functions.

Use Cases

Figure 4:
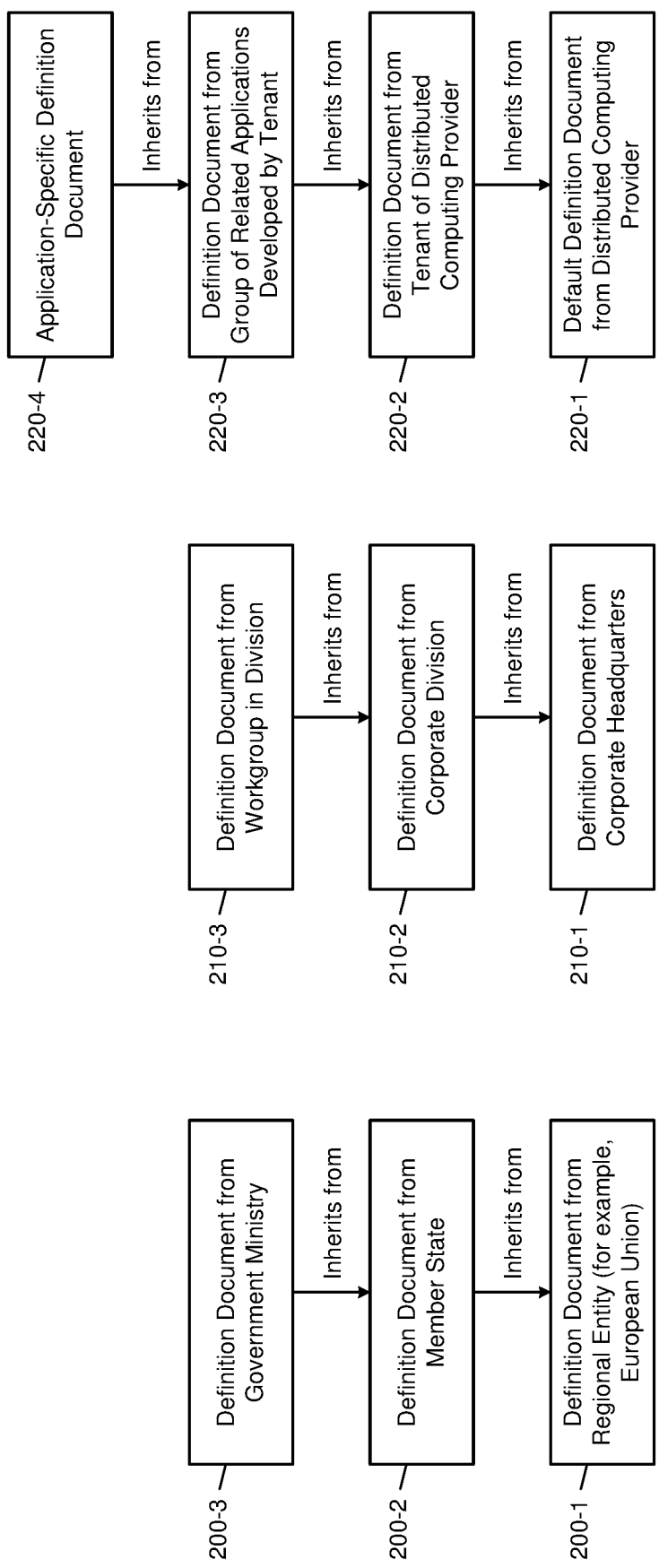
FIGS. 4A, 4B, and 4C are graphical representations of inheritance hierarchies.

FIGS. 4A-4C depict example use cases for document inheritance. The documents may define security policy, which may include specification of password policies and identity providers and may specify how a user interacts with an application. However, in other implementations, these documents may specify other features, such as what private information of a user is stored, where that information is stored, and what access controls are to be applied.

In FIG. 4A, a definition document 200-1 is specified by a regional entity, such as the European Union. The definition document 200-1 may be stored on servers controlled by the regional entity or on servers to which the regional entity has access. In other implementations, the definition document 200-1 may be generated, such as by a cloud hosting provider, based on rules and regulations promulgated by the regional entity.

A definition document 200-2 is specified by a member state belonging to the regional entity. The definition document 200-2 inherits from the definition document 200-1. For example, the definition document 200-2 may extend and/or override the definition document 200-1. The definition document 200-1 may specify which parameters can be overridden. Changes requested by the definition document 200-2 that are not permitted by the definition document 200-1 may be ignored or may be reported as an error.

A definition document 200-3 may be specified by a governmental ministry of the member state. For example, an intelligence agency of the member state may have heightened security requirements in comparison with the general policy of the member state. The definition document 200-3 may therefore, as just one example, impose greater password complexity requirements than those inherited from the definition document 200-2.

In FIG. 4B, a definition document 210-1 may be specified by the corporate headquarters of a business. A definition document 210-2 is specified by a corporate division or subsidiary and inherits from the definition document 210-1. A definition document 210-3 is specified by a workgroup of the corporate division and inherits from the definition document 210-2.

In FIG. 4C, a definition document 220-1 is established by a distributed computing provider. A definition document 220-2 is specified by a tenant (customer) of the distributed computing provider and inherits from the definition document 220-1. A definition document 220-3 is specified for a group of related applications developed by the tenant and inherits from the definition document 220-2. For example, if the tenant develops business-to-business as well as business-to-consumer applications, each group of applications may have a different definition document. A definition document 220-4 for a specific application inherits from the definition document 220-3.

Figure 5:
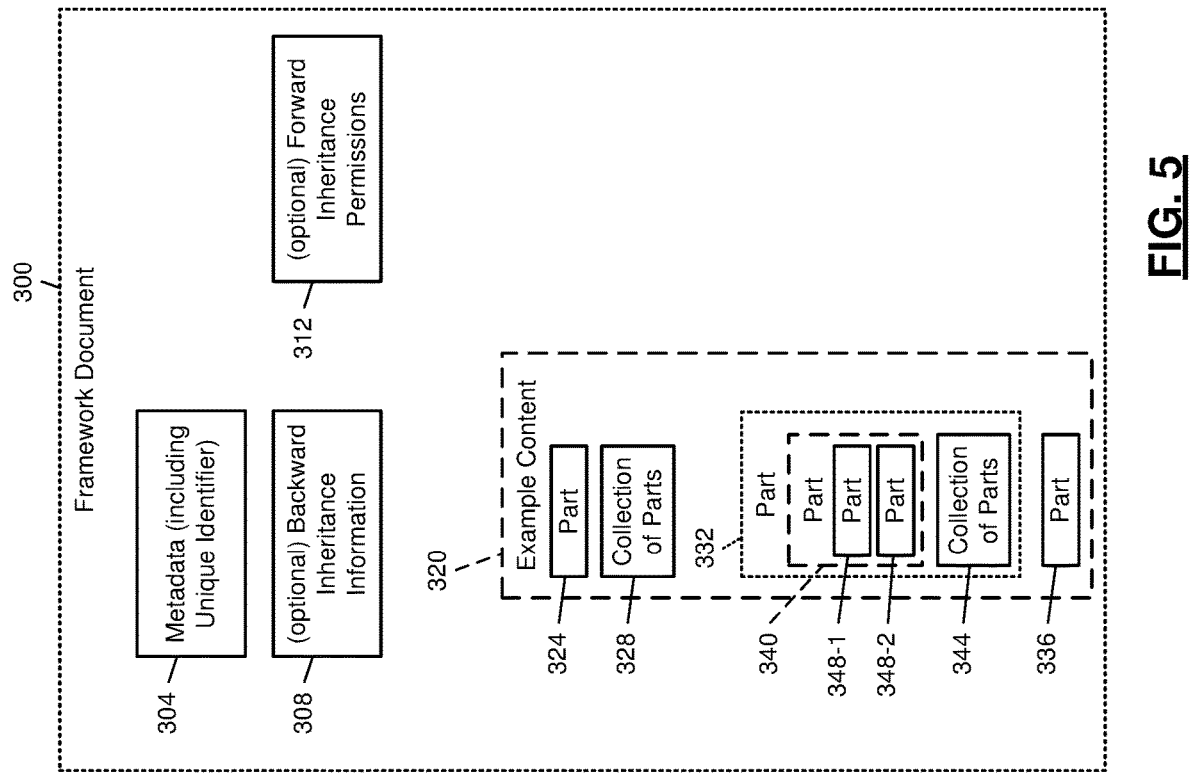
FIG. 5 is a graphical illustration of example components of a document structured according to the principles of the present disclosure.

In FIG. 5, an example framework document 300 is graphically depicted. The physical layout of the framework document 300 can vary as long as the parsing system understands how to find each portion. The framework document 300 includes metadata 304 for the framework document 300. The metadata includes a unique identifier so that the framework document can be referenced by other documents and by consumers of the framework document 300. The metadata 304 may also include version histories, modification dates, audit dates, and human readable comments.

The framework document 300 may inherit from other documents as specified by backward inheritance information 308. The backward inheritance information 308 may reference the unique identifier of another document and may specify which portions of that other document are to be inherited. In addition, the backward inheritance information 308 may specify that certain portions of that inherited document should only be applied to certain portions of the framework document 300.

The framework document 300 may also include forward inheritance permissions 312 specifying what portions of the framework document 300 can be overridden. The forward inheritance permissions 312 may also specify which documents can inherit from the framework document 300. For example, the forward inheritance permissions 312 may explicitly list the unique identifiers of documents that can inherit from the framework document 300. In other implementations, the forward inheritance permissions 312 may specify a specific tenant or domain within which documents can inherit from the framework document 300. Additional example inheritance permissions are described above.

Although not drawn to scale, example content 320 may form a majority of the framework document 300. The example content 320 includes a part 324, a collection of parts 328, a part 332, and a part 336. This particular selection and arrangement of parts is arbitrary and shown simply to demonstrate an example nested structure that can be used for hierarchical documents according to the principles of the present disclosure. The part 332 may include additional parts or collections such as part 340 and collection 344. To further demonstrate the possibilities of nesting, the part 340 includes parts 348-1 and 348-2.

Control

Figure 6A:
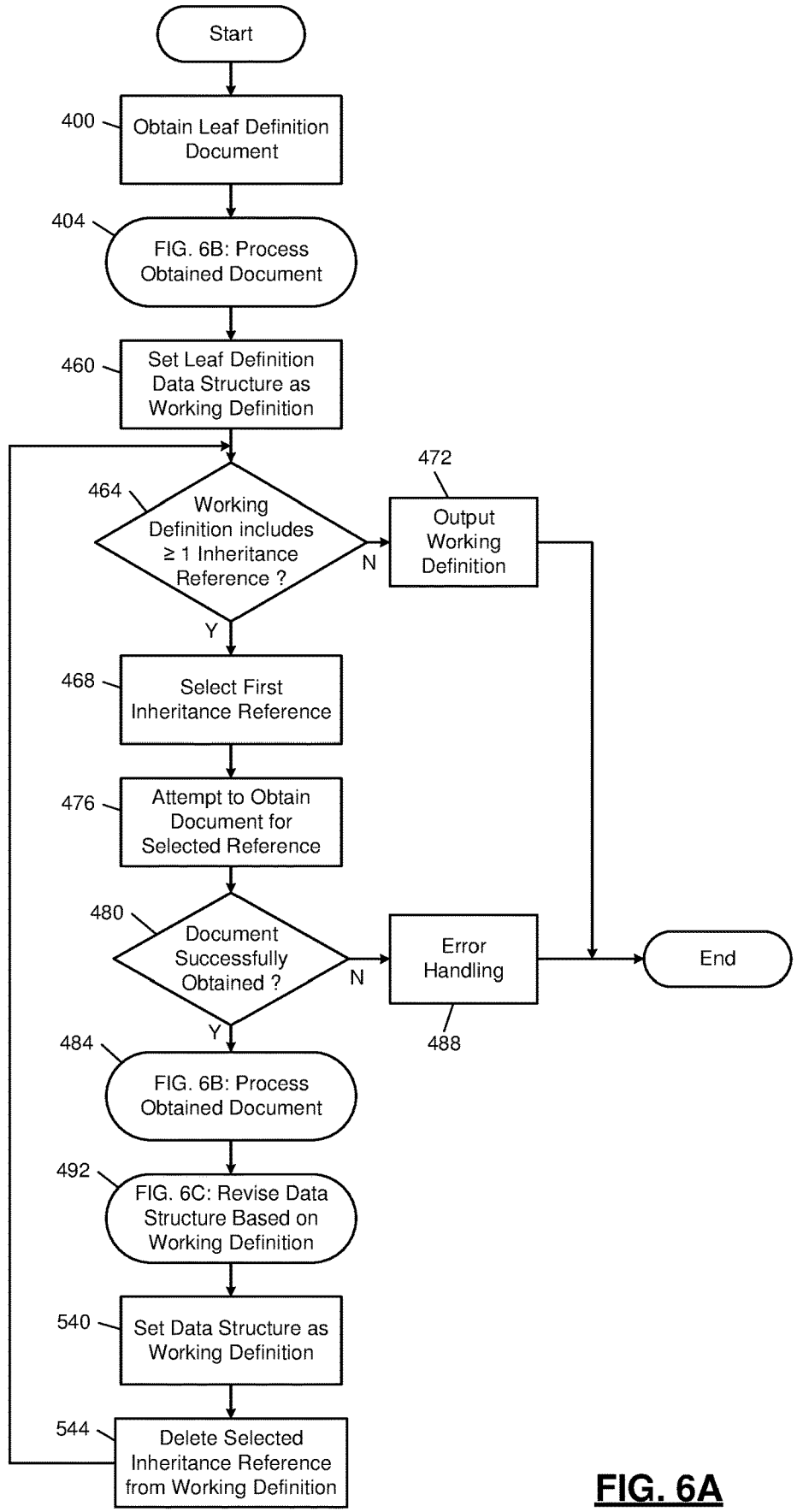
FIGS. 6A, 6B, and 6C together form a flowchart of example inheritance processing.

In FIG. 6A, example control for interpreting a hierarchal document is shown. Processing of a hierarchal set of documents may begin when a computing system will perform an action dictated by the resulting document. In other implementations, the resulting document may be generated every time a change is made to one of the underlying documents. In other implementations, a resulting document may be generated on a periodic basis, such as daily. Continuing that example, the periodic generation may be skipped when no changes have been made during the prior time to any of the underlying documents.

Figure 6B:
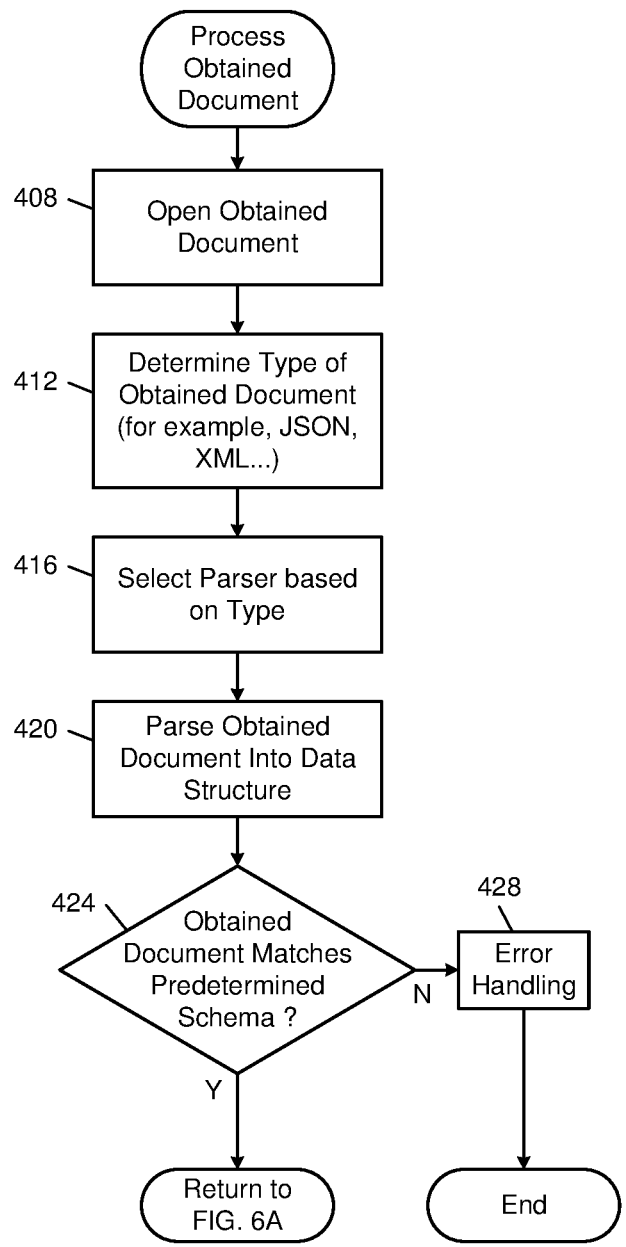

Control begins at 400, where a leaf definition document is obtained. At 404, control then transfers to FIG. 6B where the obtained document is processed. Turning to FIG. 6B, control begins at 408, where control opens the obtained document. At 412, control determines the type of the obtained document. For example, the document may be binary or text and, if text, the document may be constructed as a JSON or XML document. At 416, control selects a specific parser based on the type of the obtained document.

At 420, control uses the selected parser to read the obtained document into a predefined data structure. For example, the selected parser may be an XML parser that identifies XML tags based on angle bracket characters in an XML document. The schema of an XML document may be defined by the XML tags themselves, and therefore the XML parser constructs a data structure on-the-fly while parsing through an XML document.

Certain XML tags may be defined for inheritance purposes. For example, a document can specify an inheritance from another document by using the <BasePolicy> tag, and specifying the inherited document with <TenantID> and <PolicyID> tags. Other tags may specify restrictions on the document being inherited. For example, restrictions may be specified by the <PolicyConstraints> tag. The schemas related to inheritance tags may be defined a priori and known to the XML parser. If the information in an XML document does not conform to the defined schemas, the XML parser may output a parse error. However, there are no constraints on the remainder of the XML document—its schema is simply self-defined by its tags.

At 424, control determines whether the obtained document matches a predetermined schema. If so, control returns to FIG. 6A; otherwise, control transfers to 428. At 428, control performs error handling and then ends.

Error handling may be required when certain portions of the obtained document cannot be read into the predefined data structure. This may occur when the obtained document has been corrupted or may occur when the obtained document is using a newer schema that is not backwards compatible with the present control object. For example, the data structure may include elements that define how the obtained document can inherit from another document. A later schema may allow for more granular controls than contemplated by the current controller software. The error handling may allow the creator of the obtained document to revise the obtained document for compliance with the current controller software or may suggest that an operator of the controller software should upgrade the controller software to a more recent version.

In FIG. 6A, control continues at 460 upon return from FIG. 6B, setting the data structure corresponding to the leaf definition document as a working definition. Control continues at 464, where control determines whether the working definition includes at least one unresolved inheritance reference. If so, control transfers to 468; otherwise, control transfers to 472. At 472, there are no remaining unresolved inheritance references and therefore control outputs the working definition as the final definition. This final definition may be embodied in a document and stored, or may remain in a data structure that can be referenced by the computing system controlled by the working definition. Control then ends.

At 468, control selects a first unresolved inheritance reference in the working definition. At 476, control attempts to obtain the document indicated by the selected reference. For example, there may be a predefined data store where referenced documents can be found. In other cases, the inheritance reference may specify a uniform resource locator (URL) where the referenced document may be obtained. At 480, if the document was successfully obtained, control transfers to FIG. 6B at 484, to process the obtained document; otherwise, control transfers to 488. At 488, control performs error handling and ends. Control returns from FIG. 6B at 484 and proceeds to 492. At 492, control invokes FIG. 6C to revise the data structure from the obtained document based on the existing working definition.

Figure 6C:
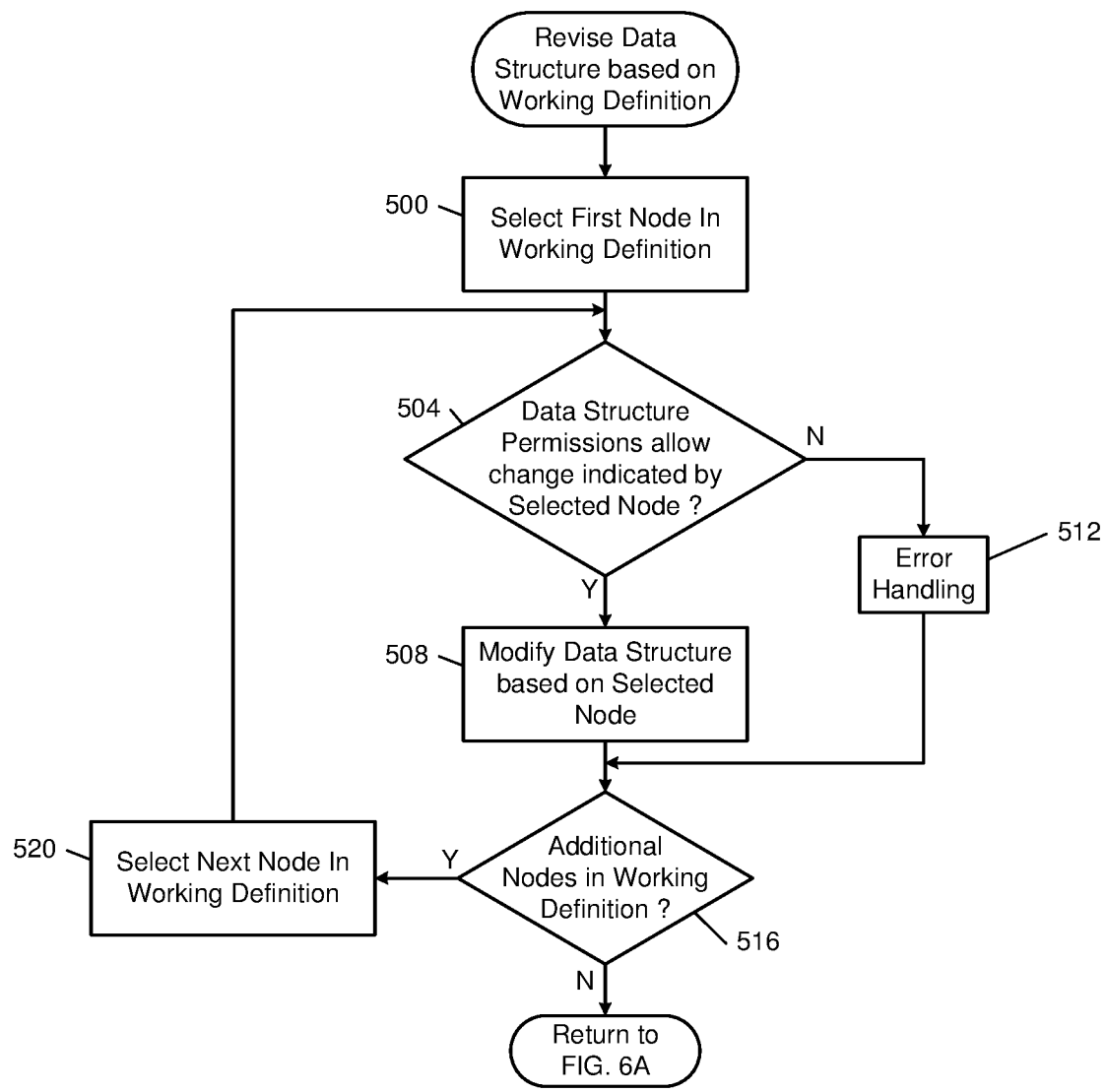

Turning to FIG. 6C, control begins at 500, where control selects a first node in the working definition. For example, the working definition may be stored as a tree structure and each node of the tree structure represents a set of parts in the working definition. In FIG. 6C, the working definition is being incorporated into a referenced document and therefore each of the nodes represents additions or changes to be made to the referenced document.

At 504, control determines whether the inheritance permissions of the data structure allow the change indicated by the selected node. If so, control transfers to 508; otherwise, control transfers to 512. At 508, control modifies the data structure based on the selected node and continues at 516. At 512, control performs error handling and continues at 516. The error handling may ignore the disallowed changes or may cause a halt to the revision process indicating that the inheritance relationship is unresolvable. At 516, control determines whether there are additional nodes in the working definition remaining to be processed. If so, control transfers to 520; otherwise, control returns to FIG. 6A. At 520, control selects the next node to be processed in the working definition and returns to 504.

Meanwhile, upon return from FIG. 6C, control continues from 492 to 540. At 540, control sets the data structure as revised by control at 492 to be the working definition. Control continues at 544, where control deletes the selected inheritance reference from the working definition. Control then returns to 464. In other implementations, control at 544 may leave the selected inheritance reference undeleted but instead may mark it as already processed and returns to 464. In such a case, the test at 464 would be whether the working definition includes one or more inheritance references.

Figure 7:
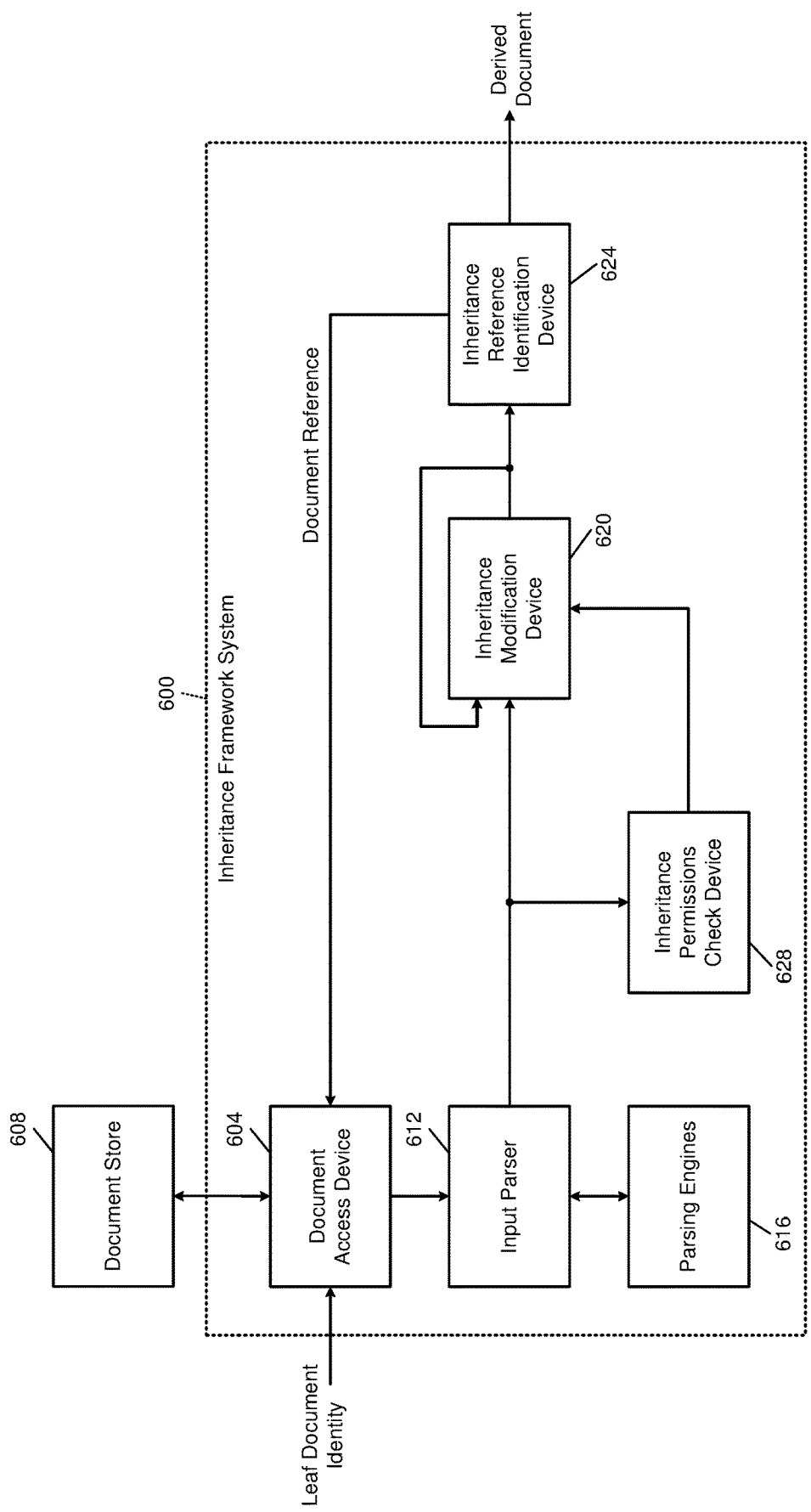
FIG. 7 is a functional block diagram of an example implementation of an inheritance framework system.

In FIG. 7, an example implementation of an inheritance framework system 600 may implement the control of FIGS. 6A-6C. The inheritance framework system 600 includes document access device 604 that retrieves documents from a document store 608. Based on the identity of a leaf document (such as receiving a unique identifier of a leaf document) the document access device 604 retrieves the leaf document from the document store 608.

An input parser 612 relies on a selected library or engine from a set of parsing engines 616 to parse the obtained document into a predefined data structure. An inheritance modification device 620 modifies the data structure based on a referenced document. An inheritance reference identification device 624 determines whether there is one or more document references in the data structure. If so, the inheritance reference identification device 624 requests that the document access device obtain the document. The inheritance modification device 620 will then modify the existing data structure based on the data structure received from the input parser 612 for the referenced document.

An inheritance permissions check device 628 verifies that the new document permits inheritance by the existing document and may also verify that the changes made to the inherited document are permitted by that document. Otherwise, the inheritance permissions check device 628 may prevent the inheritance modification device 620 from modifying the data structure based on the new data structure from the input parser 612. Once the inheritance reference identification device 624 does not identify any additional document references, the inheritance reference identification device 624 outputs the working data structure as the resulting document.

Figure 8:
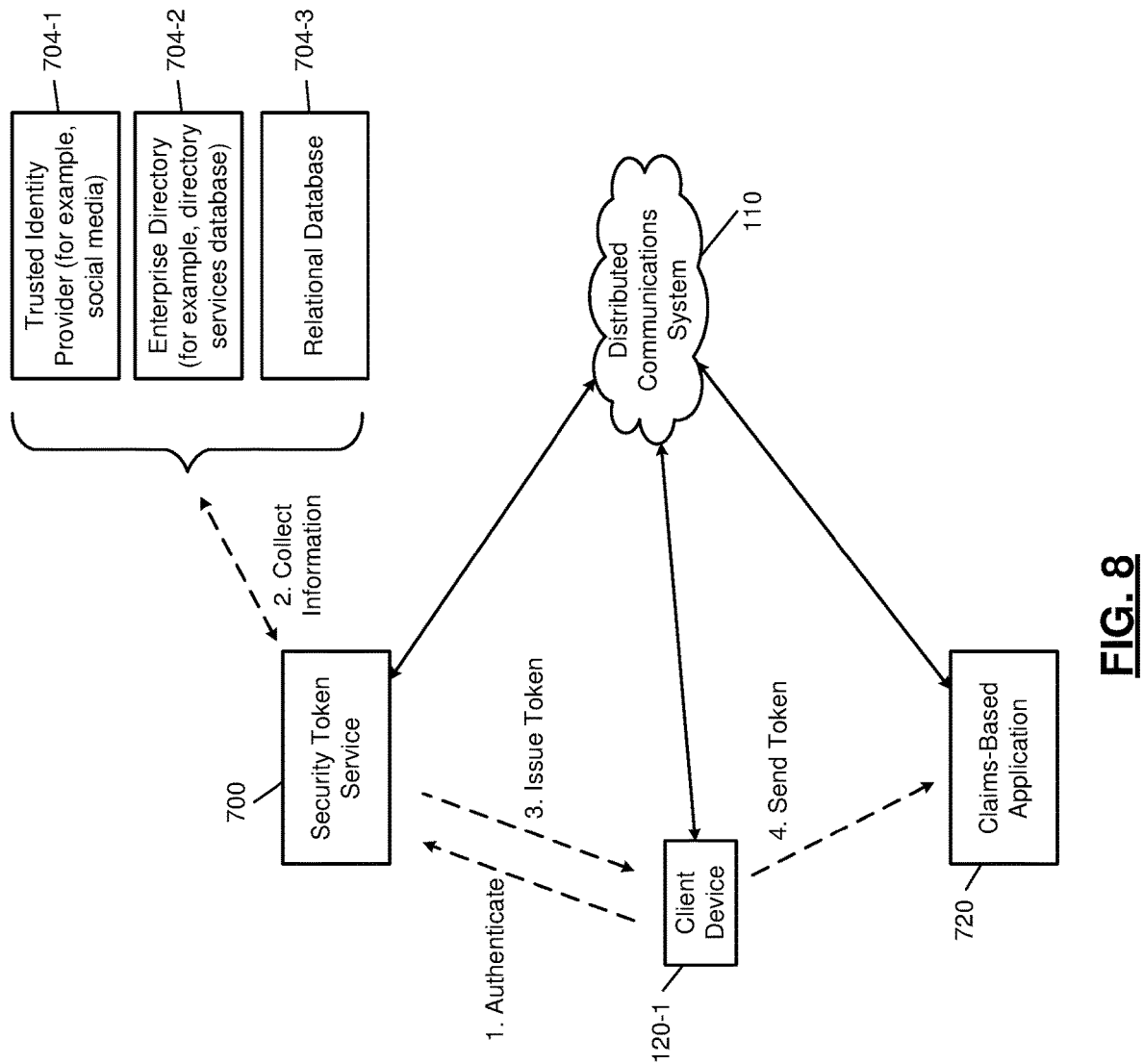
FIG. 8 is a dataflow diagram of claims-based authentication.

In FIG. 8, an example dataflow of claims-based authentication is shown. The client device 120-1 sends an authentication request to a security token service 700. The security token service 700 collects information relating to the authentication request. Information may be collected from a trusted identity provider 704-1 (such as a social media system), from an enterprise directory 704-2 (for example, a directory services database), and/or from a relational database 704-3.

Information may include whether the client device 120-1 is authorized to do anything and how to format claims indicating the authorization of the client device 120-1. The information may also include how to authenticate that the client device 120-1 is who it reports to be. The security token service 700 issues a token to the client device 120-1 in response to successful authentication. The token includes claims specifying the level of access that the client device 120-1 is offered. The client device 120-1 can then present (or, send or transmit) the token to a claims-based application 720.

For example, the claims-based application 720 may be a server application operating on the server 130-1 of FIG. 1. The dashed lines in FIG. 8 indicate the logical flow of data even though the physical communication may traverse the distributed communications system 110.

Figures 9A, 9B:
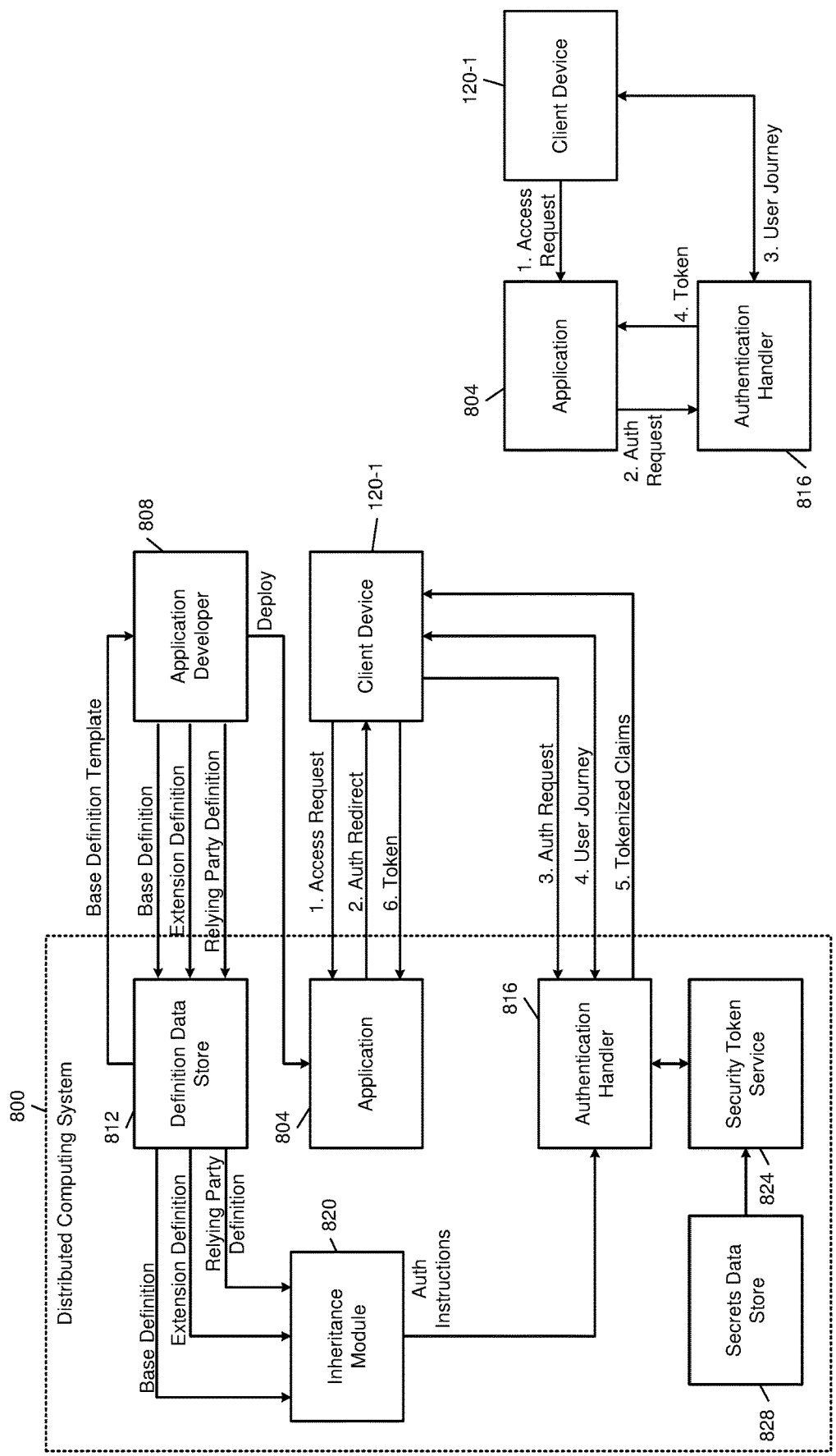
FIG. 9A is a functional block diagram of a distributed computing system depicting specification of custom policies.
FIG. 9B is a functional block diagram demonstrating an alternative authentication procedure.

In FIG. 9A, a distributed computing system 800 hosts applications, including an application 804 developed by an application developer 808. In various implementations, the distributed computing system 800 may encompass the servers 130 of FIG. 1. Components of the distributed computing system 800 may execute on one or more of the servers 130.

The application developer 808 receives a base definition template from a definition data store 812. The application developer can use the base definition template to create a base definition for security policies for use in applications developed by the application developer 808. The application developer 808 sends this base definition for storage in the definition data store 812. The application developer 808 may reference that base definition in an extension definition that inherits from the base definition. For example, the extension definition may add additional authentication features to the base definition or may permit identities from more identity providers to be used during authentication.

The application developer 808 may create a relying party definition that inherits from the extension definition. A relying party is an application or service that relies on assertions from an assertion provider, such as a security token service. The definition data store 812 stores base definitions from various application developers as well as extension definitions and relying party definitions.

The application developer 808 may then deploy the application 804 to the distributed computing system 800. When the client device 120-1 makes an access request to the application 804, the application 804 sends an authentication redirect to the client device 120-1. For example, this may be a hypertext transfer protocol (HTTP) redirect interpreted by a web browser on the client device 120-1.

Based on the redirect, the client device 120-1 sends an authentication request to an authentication handler 816. The authentication handler 816 retrieves authentication instructions from an inheritance module 820. The inheritance module 820 obtains a relying party definition for the application 804 from the definition data store 812. The relying party definition relies on the extension definition, so the inheritance module 820 retrieves the extension definition from the definition data store 812.

Because the extension definition inherits from the base definition, the inheritance module 820 obtains the base definition from the definition data store 812. As described in more detail below, each of these definition documents may be identified with a unique identifier to allow retrieval from the definition data store 812 from among all of the definition documents for different applications from different application developers.

In response to an authentication request, the inheritance module 820 may dynamically perform inheritance processing only for those portions of a resulting definition that are necessary to control the authentication request. For example, the base definition may include portions related to authentication but also to resource access. The inheritance module 820 may ignore the portions of the base definition not related to authentication. Further, if the authentication request specifies a particular parameter, such as a desired token issuer, the inheritance module 820 may ignore portions of the relying party definition, extension definition, and base definition that pertain to other token issuers. By limiting the scope of the processing, the inheritance module 820 may be able to generate updated partial definitions or documents on the fly as needed for particular situations. This may decrease the delay in implementation from changes to the underlying documents and may reduce the amount of storage needed for resulting documents.

The authentication instructions provided by the inheritance module 820 to the authentication handler 816 will specify how the client device 120-1 can authenticate to the application 804 and what claims are relevant to the application 804. The steps taken by the client device 120-1 to authenticate to the authentication handler 816 are referred to as a user journey.

For example, in one instance, the client device 120-1 may display a login page to a user that requests a username. The authentication handler 816 may then instruct the client device 120-1 to display a page that solicits a password from the user. The authentication handler 816 may then request a second factor from the client device 120-1, which may be received from the user, who may receive a test message or access a fixed or rolling code before typing the code into the client device 120-1.

The authentication handler 816 may pass the information from the client device 120-1 to a security token service 824 or may redirect the client device 120-1 to the security token service 824. The security token service 824 may be selected by the authentication handler 816 according to the authentication instructions from the inheritance module 820.

The security token service 824 may access a secrets data store 828 to verify that the information received from the client device 120-1 is authentic. For example, the secrets data store 828 may store a salted hash of the password for the client device 120-1. The password provided by the client device 120-1 can then be salted using the salt from the secrets data store 828 and hashed before being compared to the stored hash from the secrets data store 828. In response to successful authentication, the security token service 824 provides tokenized claims to the client device 120-1, either directly or through the authentication handler 816.

These claims include assertions of the identity of the user of the client device 120-1 and may include other claims, such as an email address or other access privileges relevant to the client device 120-1. The client device 120-1 can then present a token including those tokenized claims to the application 804. When the application 804 recognizes that the token was provided by the authentication handler 816 (such as by means of a cryptographic signature), the application 804 provides access to the client device 120-1.

FIG. 9B depicts an alternative authentication process in which the application 804 directly sends authentication request to the authentication handler 816. The user journey is still performed between the client device 120-1 and the authentication handler 816 or the security token service 824. However, the token is then directly provided to the application 804 from the authentication handler 816 or the security token service 824. The approach shown in FIG. 9B may be implemented in FIG. 9A in addition to or as an alternative to the authentication process shown in FIG. 9A. The process may be selected according to the authentication instructions from the inheritance module 820.

Figure 10:
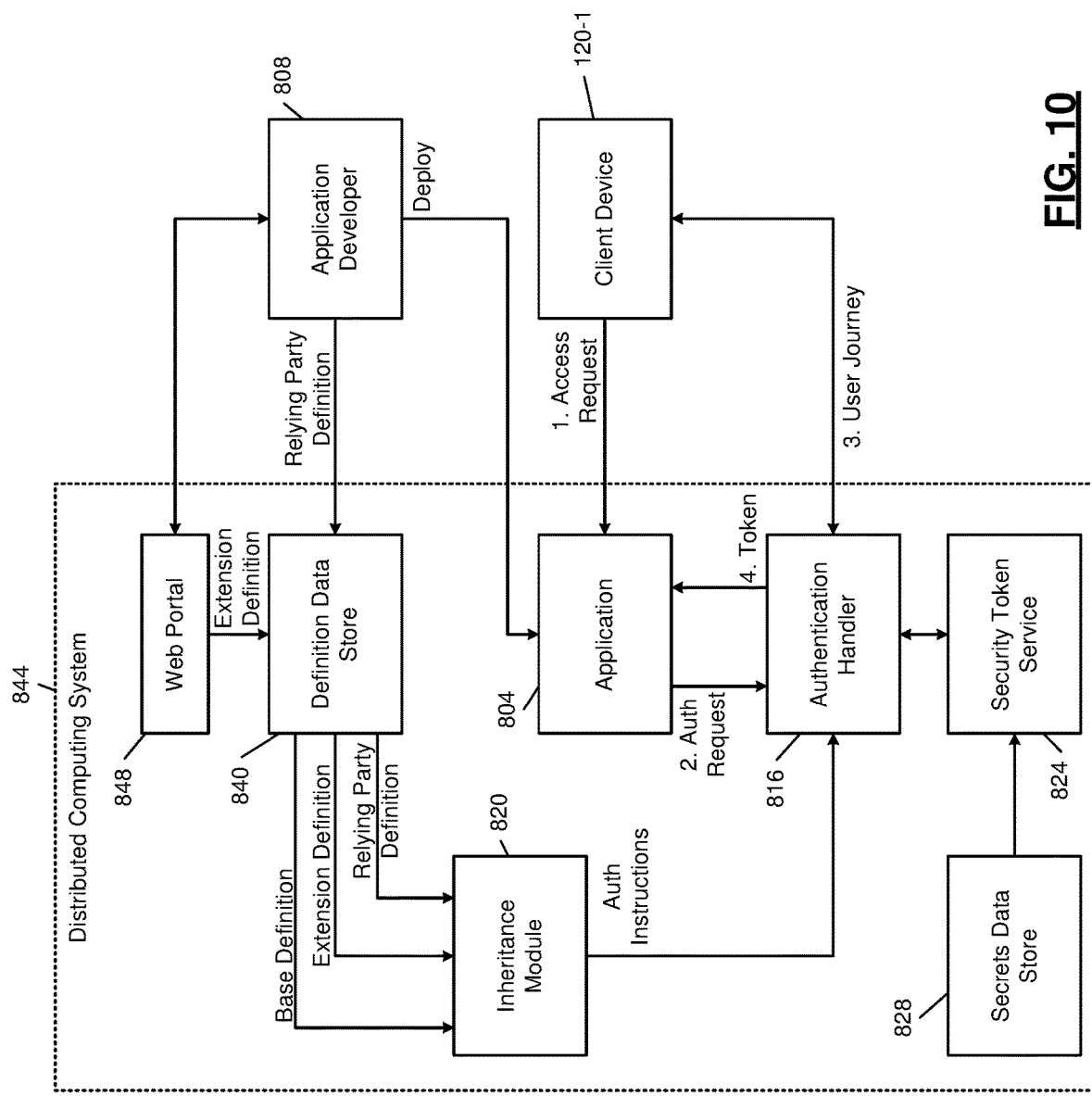
FIG. 10 is a functional block diagram of an example implementation of a distributed computing system depicting use of built-in policies for authentication.

In FIG. 10, another approach to supplying definitions to a definition data store 840 of a distributed computing system 844 is shown. In this example, the base definition may be predefined in the definition data store 840 and not available for editing by the application developer 808. The application developer 808 can create an extension definition using a web portal 848. The web portal 848 may allow the application developer 808 to modify some or all of the components of the extension definition, and may have a simplified interface that translates choices by the application developer 808 into computer-readable text for the extension definition.

The application developer 808 may then be able to directly provide the relying party definition to the definition data store 840. In this way, the amount of flexibility provided to the application developer 808 may be restricted, which may provide better usability to the application developer 808 and fewer opportunities for error or inadvisable design decisions. The inheritance module 820, the application 804, the authentication handler 816, the security token service 824, and the secrets data store 828 may function similarly to those shown in FIG. 9A.

Figure 11:
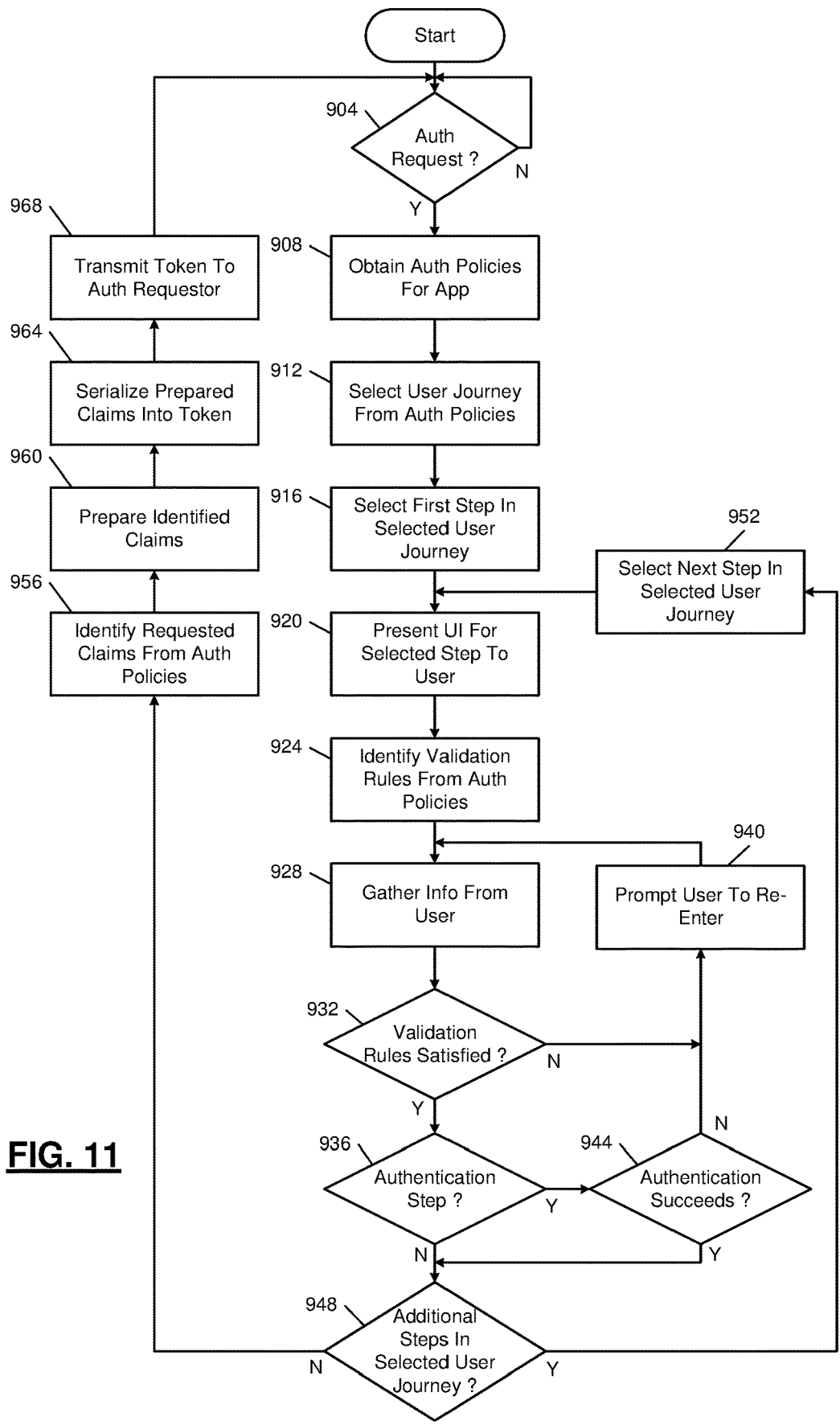
FIG. 11 is a flowchart of authentication proceeding as defined by a specification document according to the principles of the present disclosure.

In FIG. 11, example control for an authentication handler, such as the authentication handler 816 of FIG. 9A, FIG. 9B, and FIG. 10, is shown. Control begins at 904, where if an authentication request has been received control transfers to 908; otherwise, control remains at 904. At 908, control obtains authentication policies for the application corresponding to the authentication request. For example, these policies may be obtained from the inheritance module 820 of FIG. 9A or FIG. 10.

At 912, control selects the appropriate user journey from the authentication policies, and at 916 control selects the first step in the selected user journey. At 920, control presents user interface elements for the selected step to the user, such as via a web browser executing on the client device 120-1. At 924, control identifies validation rules from the authentication policies. These validation rules may also include user interface element input rules, which may restrict what the user can enter. For example, a username or email address may prevent special characters from being supplied. Or, for a numeric second factor, the input may be restricted to digits only.

At 928, control instructs the user interface elements to gather information from the user, such as via the present user interface elements. At 932, control determines whether the identified validation rules are satisfied by the user input. If so, control transfers to 936; otherwise, control transfers to 940. At 940, control prompts the user to reenter the data and returns to 928.

At 936, control determines whether the current step in the selected user journey is an authentication step. If so, control transfers to 944; otherwise, control transfers to 948. At 944, control determines whether the authentication for this step is successful. If so, control transfers to 948; otherwise, control transfers to 940. For example, authentication may include verifying a salted hash of a password entered by the user and comparing an entered second factor to a locally generated second factor corresponding to the user. At 948, if there are additional steps in the selected user journey, control transfers to 952; otherwise, control transfers to 956. At 952, control selects the next step in the selected user journey and continues at 920.

At 956, control identifies requested claims from the authentication policies. At 960, control prepares the identified claims. At 964, control serializes the prepared claims into a token. In addition, control may apply a cryptographic signature to the token indicating that the claims are attested to by the authentication handler. Control continues at 968, where the token is transmitted to the authentication requester. Control then returns to 904. In an instance where the client device is the authentication requestor, transmitting the token to the authentication requestor may be followed by transmitting a redirect so that the client device will be redirected to the application, at which point the token can be presented to the application.

EXAMPLE

The inheritance framework may be used for a security architecture in a claims-based authentication environment. The resulting document may control the schema of claims, define claims transformations, specify claims providers (such as a security token service), and outline user journey orchestration steps. Specifying claims providers may include defining protocol formats such as OpenIDConnect, OAuth, SAML, and WSFed, specifying the key used to verify claims from a particular claims provider, and specifying the URL at which to access the claims provider.

For example, a document may specify the signup policy for an application. The signup policy may specify account types (social accounts such as Facebook or local accounts such as email addresses) that consumers can use to sign up for the application. The document may specify attributes (for example, first name, postal code, and shoe size) to be collected from the consumer during signup. The document may specify whether multi-factor authentication is used, and which providers are permitted to offer multi-factor authentication. The document may specify the information (which may manifest as claims in a token) that the application receives when execution of the signup policy finishes.

The inheritance framework may be used for a cloud computing provider's access and authentication system. As an example only, the inheritance framework described here can be used for an Identity Experience Framework (IEF) used by the Azure Active Directory Business to Consumer (Azure AD B2C) cloud-based identity and access management solution from Microsoft Corp. The inheritance framework may control, on a per-policy basis, lifetimes of security tokens emitted by Azure Active Directory (Azure AD) B2C, lifetimes of web application sessions managed by Azure AD B2C, formats of important claims in the security tokens emitted by Azure AD B2C, and single sign-on (SSO) behavior across multiple apps and policies for a tenant.

Figure 12:
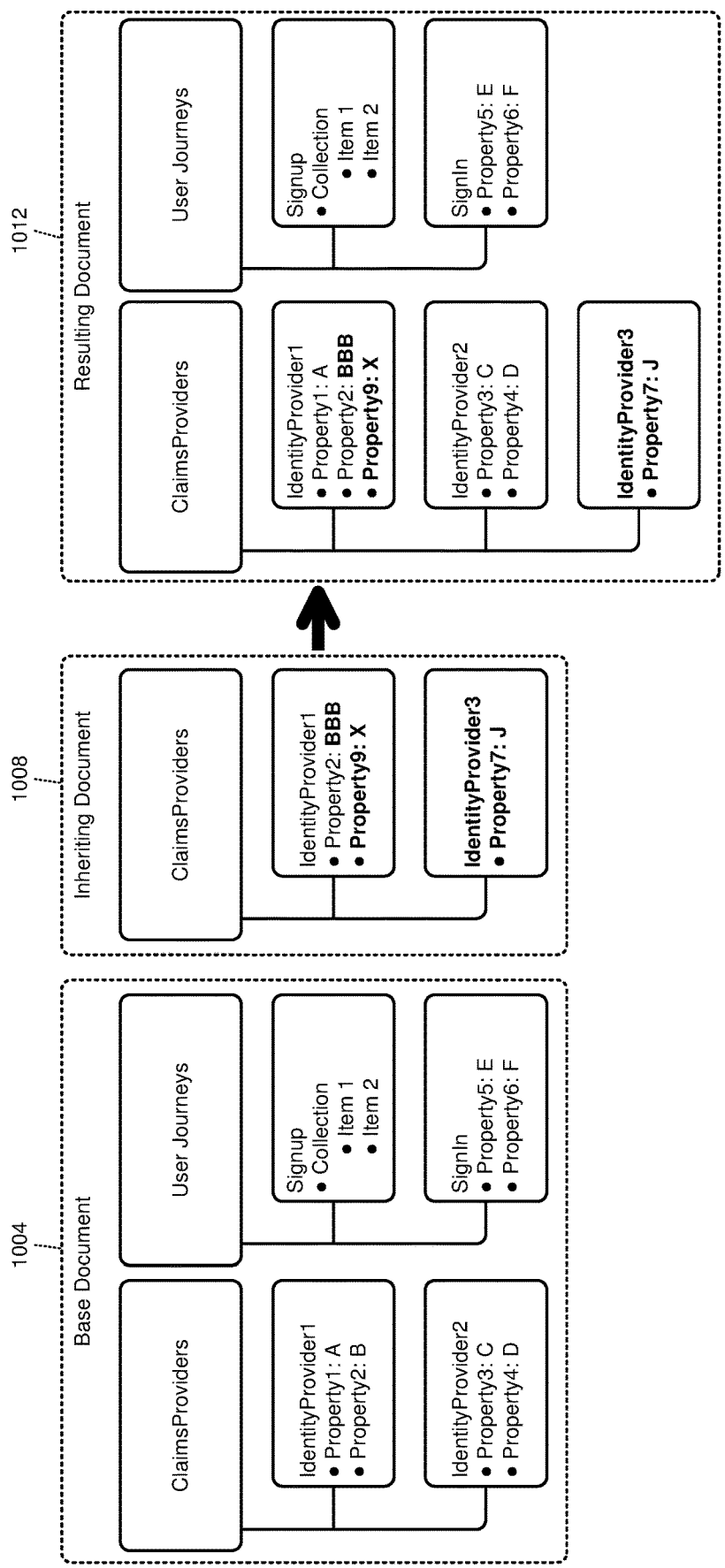
FIG. 12 is a graphical depiction of hierarchical inheritance for security policy documents.

FIG. 12 shows an example of inheritance for a security architecture, such as the Identity Experience Framework from Microsoft Corp. A base document 1004 has two parts, each of which is further composed of two parts. An inheriting document 1008 inherits from the base document 1004 and provides modifications that arrive at a resulting document 1012. The differences between the resulting document 1012 and the base document 1004 are emphasized in bold type.

The User Journeys part from the base document 1004 is not modified by the inheriting document 1008 and is processed exactly as defined in the base document 1004. The inheriting document 1008 defines a new part, IdentityProvider3, which did not exist in the base document 1004. This is an example of addition to the base document 1004—specifically, permitting another identity provider to act as a claims provider.

The inheriting document 1008 modifies the part IdentityProvider1 by adding a new property. Property9, which might, for example, specify a claim to be requested from IdentityProvider1 or specify an alternative URL at which IdentityProvider1 can be accessed. The inheriting document 1008 modifies the value of the property Property2 from the base document 1004. Therefore, as controlled by the resulting document 1012, the IEF would use the new value (BBB) of Property2 with IdentityProvider1.

As another example for illustration only, a derived document (leaf_xml.txt) is submitted with this application. The derived document references an example intermediate document (intermediate_xml.txt). The intermediate document is so-named because it in turns references an example base document (base_xml.txt). In intermediate_xml.txt, cryptographic keys in certificates are truncated (indicated by ellipses) for brevity. In base_xml.txt, an enumeration of state names has been shortened (indicated by an ellipsis) for brevity.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computer-implemented method comprising:
   receiving a framework document corresponding to a first application hosted by a distributed computing provider, the framework document comprising a backwards inheritance property;
   parsing the framework document according to a data structure definition into a first data structure that includes content from the framework document, wherein the data structure definition describes one or more inheritance properties, including at least a backwards inheritance property;
   in response to presence of the backwards inheritance property in the first data structure:
      identifying an inherited base document having a unique identifier referenced by the backwards inheritance property;
      obtaining the inherited document having the unique identifier referenced by the backwards inheritance property;
      reading the inherited base document;
      determining inheritance permissions from the inherited document, including at least one or more inheritance permissions that specify inheriting documents that can inherit content from the inherited base document and that specify which content in the inherited base document can be inherited by and/or overridden by the specified inheriting documents; and
      in response to determining the inheritance permissions permit the framework document to inherit content from the inherited base document, selectively modifying the content in first data structure to at least incorporate security token content from the inherited base document, by at least appending the security token content from the inherited base document to the content from the framework document in the first data structure and/or by replacing content from the framework document in the first data structure with the security token content from the inherited base document; and
   controlling authentication of a user to the first application according to the first data structure based at least in part on the security token content from the inherited base document.

2. The method of claim 1 wherein the controlling authentication includes:
   selecting a security token service specified by the first data structure; and
   redirecting the user to the selected security token service.

3. The method of claim 1 further comprising, in response to presence of additional inheritance properties in the first data structure, recursively repeating the identifying, the obtaining, the parsing, the reading, the determining, and the selectively modifying for each of the additional inheritance properties in the first data structure.

4. The method of claim 1 wherein identifying the inherited document based on the first inheritance property includes using the unique identifier of the inherited document.

5. The method of claim 1 wherein reading the inherited document includes parsing the inherited document into a second data structure according to the data structure definition.

6. The method of claim 1 further comprising, after the selectively modifying, storing the first data structure as an output document for future use.

7. The method of claim 6 further comprising updating the output document in response to modifications to either the first document or the inherited document.

8. The method of claim 1 wherein the first document is received in response to an authentication request from the first application.

9. The method of claim 8 wherein the parsing the first document into the first data structure is limited to portions of the first document governing the authentication request.

10. The method of claim 1 wherein the parsing the first document includes determining a file type of the first document and selecting a parser from a plurality of parsing engines based on the determined file type.

11. A system comprising:
   at least one processor; and
   a computer-readable medium configured to store instructions for execution by the at least one processor, wherein the instructions include:
      receiving a framework document corresponding to a first application hosted by a distributed computing provider, the framework document comprising a backwards inheritance property;
      parsing the framework document according to a data structure definition into a first data structure that includes content from the framework document, wherein the data structure definition describes one or more inheritance properties, including at least the backwards inheritance property;
      in response to presence of the backwards inheritance property in the first data structure:
         identifying an inherited base document having a unique identifier referenced by the backwards inheritance property;
         obtaining the inherited document having the unique identifier referenced by the backwards inheritance property;
         reading the inherited base document;
         determining inheritance permissions from the inherited document, including at least one or more inheritance permissions that specify inheriting documents that can inherit content from the inherited base document and that specify which content in the inherited base document can be inherited by and/or overridden by the specified inheriting documents; and in response to determining the inheritance permissions permit the framework document to inherit content from the inherited base document, selectively modifying the content in first data structure to at least incorporate security token content from the inherited base document, by at least appending the security token content from the inherited base document to the content from the framework document in the first data structure and/or by replacing content from the framework document in the first data structure with the security token content from the inherited base document; and controlling authentication of a user to the first application according to the first data structure based at least in part on the security token content from the inherited base document.

12. The system of claim 11 wherein the controlling authentication includes:
selecting a security token service specified by the first data structure; and
redirecting the user to the selected security token service.

13. The system of claim 11 wherein the instructions include, in response to presence of additional inheritance properties in the first data structure, recursively repeating the identifying, the obtaining, the parsing, the reading, the determining, and the selectively modifying for each of the additional inheritance properties in the first data structure.

14. The system of claim 11 wherein identifying the inherited document based on the first inheritance property includes using the unique identifier of the inherited document.

15. The system of claim 11 wherein reading the inherited document includes parsing the inherited document into a second data structure according to the data structure definition.

16. The system of claim 11 wherein the instructions include, after the selectively modifying, storing the first data structure as an output document for future use.

17. The system of claim 16 wherein the instructions include updating the output document in response to modifications to either the first document or the inherited document.

18. The system of claim 11 wherein the first document is received in response to an authentication request from the first application.

19. The system of claim 18 wherein the parsing the first document into the first data structure is limited to portions of the first document governing the authentication request.

20. The system of claim 11 wherein the parsing the first document includes determining a file type of the first document and selecting a parser from a plurality of parsing engines based on the determined file type.

* * * * *